Aug. 9, 1960  I. E. COX  2,948,571
JOURNAL BEARINGS
Filed Aug. 8, 1958  5 Sheets-Sheet 1

Inventor
Isaac Eugene Cox
By Wallace and Cannon
Attorneys

Aug. 9, 1960     I. E. COX     2,948,571

JOURNAL BEARINGS

Filed Aug. 8, 1958     5 Sheets-Sheet 2

Inventor
Isaac Eugene Cox

By Wallace and Cannon
Attorneys

Aug. 9, 1960  I. E. COX  2,948,571
JOURNAL BEARINGS
Filed Aug. 8, 1958  5 Sheets-Sheet 3
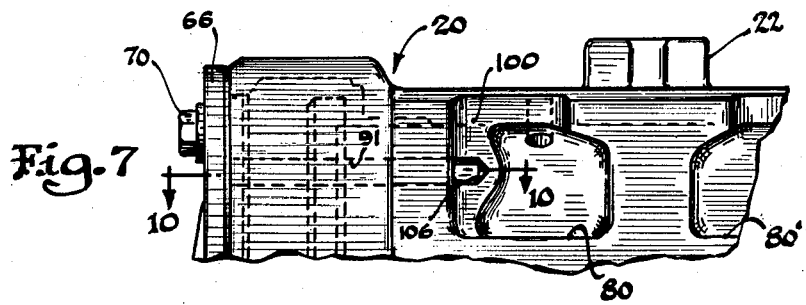
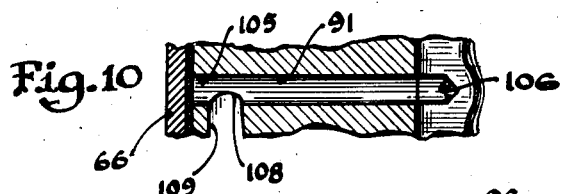
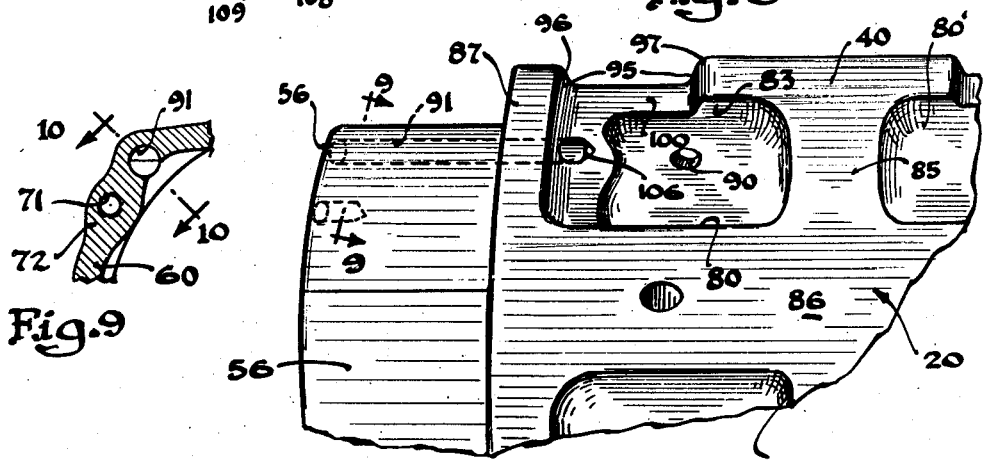
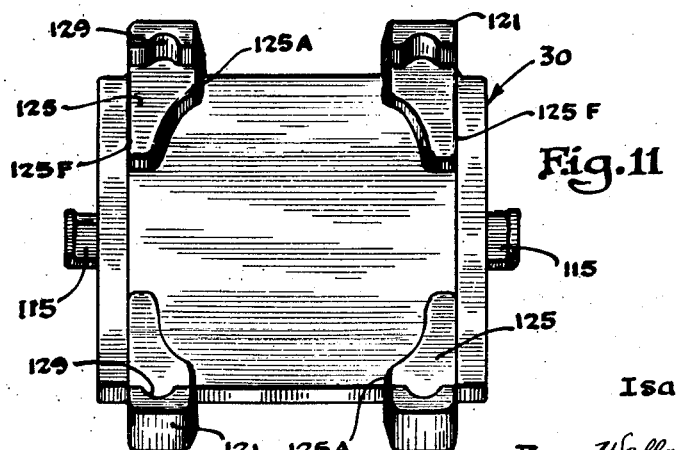
Inventor
Isaac Eugene Cox
By Wallace and Cannon
Attorneys Inventor
Isaac Eugene Cox
By Wallace and Cannon
Attorneys Aug. 9, 1960  I. E. COX  2,948,571
JOURNAL BEARINGS
Filed Aug. 8, 1958  5 Sheets-Sheet 5

Inventor
Isaac Eugene Cox
By Wallace and Cannon
Attorneys

United States Patent Office 2,948,571
Patented Aug. 9, 1960

2,948,571

JOURNAL BEARINGS

Isaac Eugene Cox, Kirkwood, Mo., assignor to American Brake Shoe Company, Wilmington, Del., a corporation of Delaware Filed Aug. 8, 1958, Ser. No. 754,211

17 Claims. (Cl. 308—79)

This invention relates to a railroad journal bearing, and this application is a continuation-in-part of Serial Number 656,297, filed May 1, 1957, now abandoned.

Increasing speeds of railway cars has necessitated studies of conventional bearing structure, lubricants and lubricating systems used in conjunction with the journals of the car axles, and such studies are primarily concerned with preventing hot boxes which, as is well known, represent a substantial hazard in railway traffic. Of particular importance in surmounting the hot box problem is proper lubrication of the engaging surfaces of the car journal and the bearing. Thus, it is of advantage to assure that oil used to lubricate the journal be maintained in a highly fluid state even under the most severe cold weather conditions, and one of the objects of the present invention is to assure good heat transfer between the bearing and the reservoir for lubricant by constructing the bearing in the form of a one-piece sleeve of cast bearing metal such as bronze or aluminum base bearing metal. Another object of the present invention ancillary to this is to construct the bearing with an oil reservoir spaced from a discontinuous portion of the inner cylindrical bearing surface of the bearing and in which a lubricating pad or the like may be disposed to engage directly the journal at such discontinuous area of the bearing surface, whereby a highly advantageous relay of lubricant to the journal is attained.

It is essential that the bearing for a railway car journal be so constructed as to allow for some lateral play of the journal. In a completely enclosed or hermetically sealed bearing, therefore, the journal acts as a piston tending to establish alternate pressure and suction strokes, and such pressure stroking by the journal can be sufficient to cause loss of lubricant in those instances where a supply of lubricant is stored in a chamber within the bore of the bearing. Another object of the present invention is to vent the bore of the bearing so as to dissipate internal pressure induced by the journal in the foregoing manner; and since the journal necessarily has an opposite suction effect another object of the present invention is to so construct the vent as to prevent undesirable foreign matter from being drawn into the bore of the bearing during such suction strokes. A further object of the present invention in this same connection is to condense or settle in the vent passage volatilized or aspirated lubricant that may tend to be entrained in the pressurized stream of air passing therethrough so that such lubricant will be drawn back into the bore of the bearing during the journal suction stroke; and another object of the invention in this same connection is to prevent contaminating water, snow or the like from being drawn into the bore of the bearing during the journal suction stroke.

The impact that may be impressed upon a railway journal bearing incidental to road imperfections, sudden braking forces and the like are in many circumstances most severe, such that it becomes important that the bearing for the journal be capable of effectively absorbing the most severe forms of mechanical shock. Another object of the present invention is to construct a bearing including a one-piece cast body member embodying the above described lubricating advantages together with the absence of mechanically joined parts that are likely to wear one on the other or become loosened, distorted or broken as a result of mechanical impact.

It will be realized that due to motion of the railway car, forces are established which tend to displace a bearing relative to the car journal either in the direction of the axis of the car journal, transverse to the car journal or in a rotative sense. Inasmuch as such relative motions should be held to a minimum, a further object of the present invention is to so construct the bearing as to accommodate slight axial movement of the car journal relative to the bearing, while effectively preventing excessive or undesirable rotative or endwise movement of the bearing relative to the car journal by having resort to an adapter of novel construction having parts complemental to opposed parts of the bearing and opposed parts of the car truck structure.

It is of course important in a lubricated railway journal bearing to prevent loss of lubricant, and a mode of assuring this has been mentioned above. Yet another object of the present invention is to construct the bearing sleeve with rear and front end collars adapted to be sealed against loss of lubricant.

Other objects of the present invention are to enable a cast, one-piece substantially 360° sleeve-type journal bearing to be used either on pedestal-type or box-type car trucks; to so construct a journal bearing of the foregoing kind as to require no alterations in standard or AAR approved railway car truck structures; and to construct a railway journal bearing having a high salvage value, that is, one which when worn can be salvaged for melting and recasting.

There are many kinds of railroad cars that are turned over 180° incidental to unloading operations, such that the oil normally in the bottom of the journal box in effect goes to the top, sometimes these cars are held stationary in a 90° tilted condition for a significant period of time. Another object of the present invention is to assume that the oil shifted in this manner will not seep out the vent passages embodied in the journal bearing structure of the present invention.

Other and further objects of the present invention will be apparent from the following description and claims and are illustrated in the accompanying drawings which, by way of illustration, show a preferred embodiment of the present invention and the principles thereof and what I now consider to be the best mode in which I have contemplated applying those principles. Other embodiments of the invention embodying the same or equivalent principles may be used and structural changes may be made as desired by those skilled in the art without departing from the present invention.

In the drawings:

Fig. 7 is a partial top plan view of the bearing of the present invention;

Fig. 8 is a partial perspective view of the back of the bearing of the present invention;

Fig. 9 is a detail view taken substantially on the line 9—9 of Fig. 8;

Fig. 10 is a detail sectional view taken substantially on the line 10—10 of Fig. 9 and showing certain related parts;

Fig. 11 is a bottom plan view of the adapter shown in Fig. 5;

Figure 13:
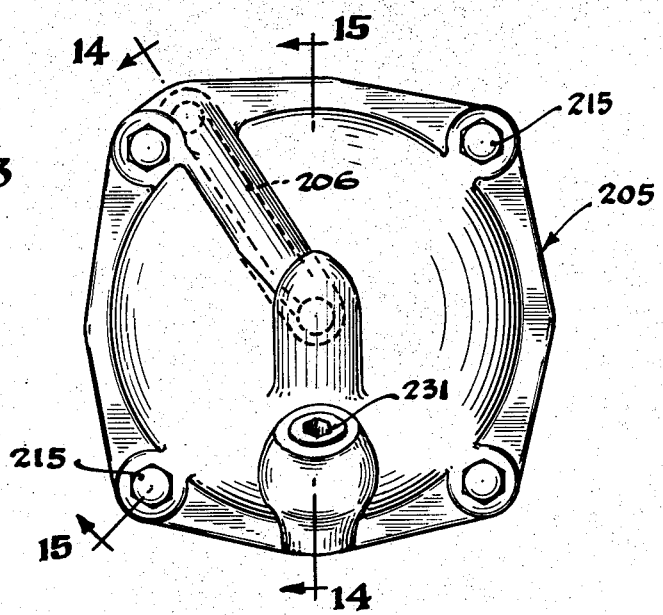
Fig. 13 is a front plan view of the front cover for the bearing of Fig. 12.
Figure 14:
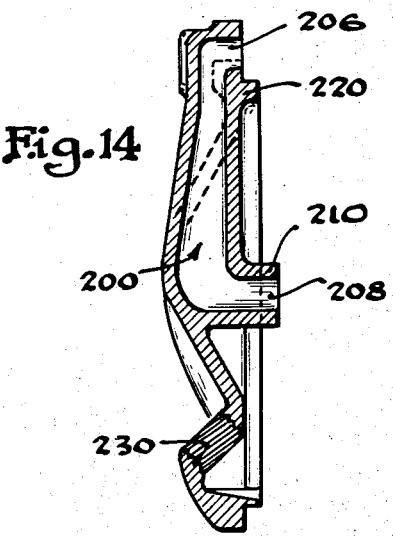
Figure 15:
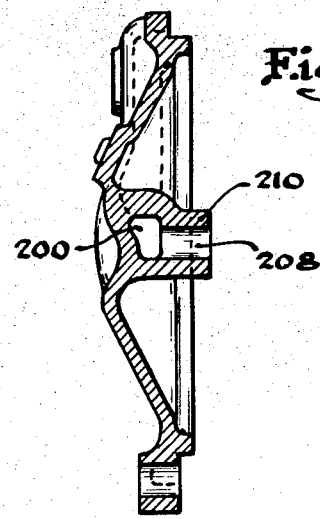

Figs. 14 and 15 are sectional views taken respectively on the lines 14—14 and 15—15 of Fig. 13.

Figure 1:
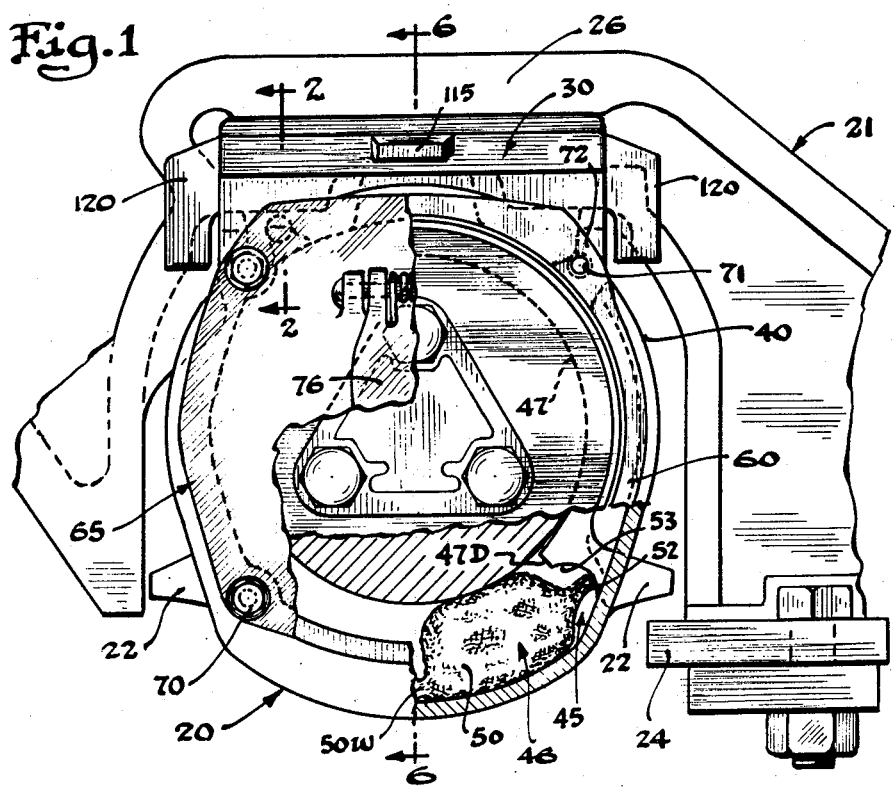
Fig. 1 is a front elevation of a portion of a pedestal-type car truck associated with a bearing of the present invention, certain parts being broken away.

In Fig. 1 of the drawing, a bearing 20 of the present invention is illustrated in association with a portion of the pedestal 21 of a pedestal-type railway car truck, but, as will be pointed out hereinafter, the bearing 20 is also adapted to be used in association with a railway car truck provided with a conventional journal box. Thus, projecting from the outer wall of the bearing 20 at the lower extremities thereof are integral side lugs 22, and depending upon the left or right hand disposition of the assembly a lug as 22 is adapted to be disposed above a limit plate 24 included in the pedestal frame structure. The pedestal frame 21 includes a heavy top plate 26 spaced above the bearing 20, and this top plate has a lower surface 26S, Fig. 6, which bears on the arcuate back of an adapter 30 to be described in detail hereinafter, and the adapter 30 in turn has a lower flat surface in flush engagement with the flat back of the bearing 20 as will be described. Thus, it will be realized that in practice the entire load of the car is impressed in the bearings 20 and in turn on the car axles.

Figure 6:
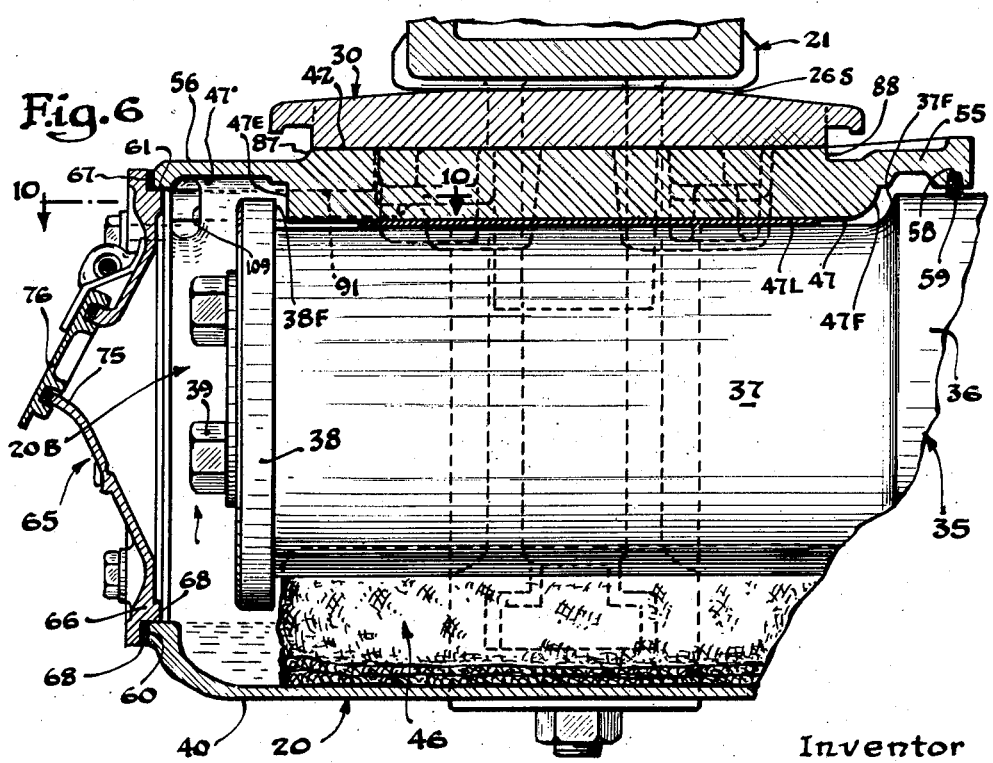
Fig. 6 is a sectional view taken substantially on the line 6—6 of Fig. 1.

Referring to Fig. 6, the axle of a railway car is indicated at 35 and includes a so-called dust guard seat 36, a journal portion 37 of less diameter than the seat 36 and which is disposed within the bore 20B of the bearing 20, and an end cap 38 of greater diameter than the journal 37 and which is secured to the outer end of the journal 37 by cap screws 39. Thus, under the present invention, the outer end of the journal 37 is provided with a removable cap, but it should be pointed out that such removable caps are not new in the art and represent one form of accepted standard AAR practice. When the bearing 20 is to be mounted on a journal, the journal cap 38 is removed, and after the bearing has been properly positioned the cap 38 is then secured in place and serves to prevent end displacement of the journal relative to the bearing as will be described.

The bearing 20 in the present instance includes a solid one-piece cast body member in the form of a sleeve having a bore 20B, as was mentioned, and an outer wall 40, Figs. 1, 6 and 8, of continuous 360° dimension. The back 42 of the bearing, Fig. 6, that is, the upper portion of the outer wall which is to be disposed beneath the top plate 26 of the pedestal frame 21, is flat for reasons to be pointed out hereinafter. The opposed sides of the outer wall 40 are rounded as shown in Fig. 1, and the bottom or lower peripheral portion of the bearing outer wall is in effect underslung as shown in Fig. 1 to afford a chamber or reservoir 45 for lubricant and a lubricator 46 within the bore of the bearing.

The internal bore of the bearing in which the journal 37 is rotatably supported is defined in part by an inner wall 47′ rounded at 47 and the rounded wall 47 includes a lining 47L, Fig. 6, of bearing metal which is of less axial length than the over-all axial length of the bore 20B. The rounded inner wall 47 thus afforded represents the main bearing surface for the journal 37. Preferably, the body portion of the bearing 20 is cast in bronze or like bearing metal and the lining 47L is of babbitt bearing metal or the like. It should, however, be pointed out that the body portion of the bearing 20B may be cast in aluminum, and the aluminum alloy may be so selected as to be capable of supporting the journal 37 rotatably at low friction without a separate bearing lining a 47L.

The cylindrical inner wall of the bearing representing the main bearing surface for the journal 37 is discontinuous at 47D, Fig. 1, in the lower peripheral area that is aligned with the chamber 45, and such discontinuous area of the bearing surface enables the lubricator 46 to be disposed in the chamber 45 so as to be in direct engagement with the journal 37. The lubricator 46 is in the nature of that described in application Serial No. 582,030 filed May 1, 1956 and thus embodies an insert of oil-resistant sponge rubber or the like (not shown) encased in a cover 50, Fig. 1, of fast wicking woven material. The lubricator 46 is dual in nature, that is, embodies a pair of such covered inserts joined by a web portion 50W, Fig. 1, of the cover 50, there being but one of the dual sides of the lubricator 46 shown in Fig. 1. The ends as 52 of the lubricator (which are adapted to be stiffened) engage rounded solid surfaces 53 within the lubricator chamber 45, thereby preventing shifting or displacement of the lubricator 46 due to motion of the journal.

The opposed open ends of the bearing inner wall 47′ as shown in Fig. 6, are of enlarged inner diameter relative to the inner cylindrical wall 47 which represents the main bearing surface and such enlargements are at areas opposite the dust guard seat 36 of the car axle and the end cap 38 thereby affording annular end collars 55 and 56 which respectively define the inner and outer limits of the bore of the sleeve 20. The inner end collar 55 is formed with an annular groove 58 about the inner face thereof and a seal ring 59 is pressed therein to engage the dust guard seat 36 of the car axle 35 thereby sealing off the inner end of the bearing bore against loss of lubricant and ingress of dust or like foreign matter. The extreme outer end of the collar 56 is defined by a flat annular terminal face 60 disposed forwardly of a squared inner annular marginal portion 61. A removable cover plate 65 is mounted on the outer or front open end of the bearing 20 thus defined, and the plate 65 includes an annular wall 66 formed with surfaces 67 and 68 complemental to the end surfaces 60 and 61 of the bearing 20. An annular gasket 68 is disposed between the opposed surfaces 60 and 67, and the arrangement is such that when the cap is mounted on the open front or outer end of the bearing 20 the surface 68 of the cover plate 65 engages the inner marginal surface 61 of the bearing. The cover plate 65 is held on the bearing by screws 70, Fig. 1, which are threadedly mounted in tapped openings 71, Figs. 1 and 9, formed in the face 60 of the bearing 20 at enlarged areas 72, Figs. 1 and 9.

The front cover plate 65 is formed in the medial portion thereof with a spout 75, Fig. 6, adapted to be normally closed by a spring biased cap 76, and by opening the cap 76 oil may be added to the reservoir 45. When the interior of the bearing is to be inspected or when the lubricator 46 is to be replaced, the cover plate 65 is removed.

It is advantageous that there be accommodation for a slight amount of lateral play between the journal 37 and the bearing 20 as mentioned above. To this end, the arrangement of parts is such that in normal position the end cap 38 of the journal 37 has the rear or inner face 38F, Fig. 6, thereof displaced slightly forwardly of the flat forward end 47E of the cylindrical bearing wall 47, and when this condition prevails the usual fillet surface 37F of the journal forward of the seat 36 is displaced somewhat rearwardly of a complemental fillet surface 47F formed on the bearing wall 47 at the rear or inner end thereof.

Under and in accordance with the present invention, the bore of the bearing 20 is advantageously vented so as to prevent build up of pressure therein due to lateral shift of the journal and which is likely to create pressure on lubricant in the reservoir 45. Such venting is attained by a novel arrangement of passage means to be described hereinafter, and this is so accomplished that foreign matter such as dust, snow or the like is prevented from becoming drawn through the passage means during a suction stroke of the journal. Moreover, in the event of overheating of the bearing 20 the vent system to be described hereinafter enables this hazardous condition to be detected either as the result of odors or an apparent condition of actual combustion.

Figure 5:
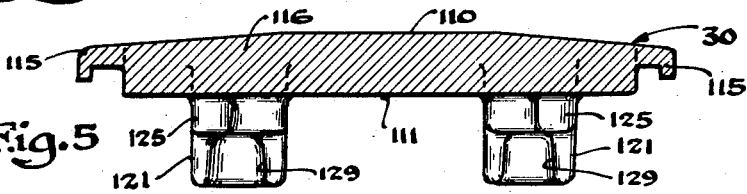
Fig. 5 is a sectional view of the adapter taken substantially on the line 5—5 of Fig. 4.

The vent system in the present instance includes an enlarged dust pocket 80, Figs. 7 and 8, formed in the flat back of the bearing 20, and in order to accommodate the adapter 30, Fig. 5, which incidentally is configured to contribute to the advantageous vent passage arrangement, other pockets 80' are formed in the back of the bearing to provide in all four symmetrically arranged pockets. However, the pocket 80 is the only pocket which represents an element of the vent system.

Figure 2:
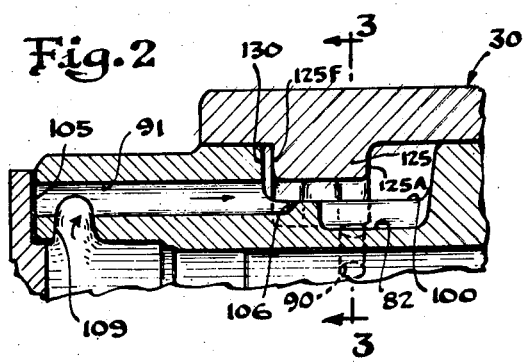
Fig. 2 is a detail sectional view on an enlarged scale taken substantially on the line 2—2 of Fig. 1 and showing details of a portion of the bearing and adapter of the present invention.

As shown in Figs. 7 and 8, the pocket 80 is generally rectangular in shape and is of substantial depth as afforded by the substantial thickness of the back of the bearing as can be appreciated from Figs. 2 and 6. The dust pocket 80 as well as the pockets 80' have vertical inner side walls 81, Fig. 3, adjacent the main longitudinal axis of the bearing, bottom walls 82 which slope downwardly and away from the wall 81 toward a side of the bearing outer wall and also include vertical outer walls 83, Figs. 3 and 8. The two pockets which are on one side of the bearing are separated one from another by an intervening web or solid portion 85, Fig. 8, which has an upper surface in the plane of the flat back 42, Fig. 6, of the bearing, and this is likewise true with respect to a main solid center rib 86 which extends axially of the back of the bearing. The pockets 80 and 80' which are adjacent the front collar 56 are spaced therefrom by a transverse solid rib 87, Figs. 6 and 8, and as shown particularly in Fig. 6 the upper surface of the rib 87 is coplanar with the flat back of the bearing 42 in a plane displaced above the uppermost surface of the front collar 56 of the bearing 20, and this is likewise true with respect to a like rib 88, Fig. 6, adjacent the rear collar 55. Thus it will be seen that while the back 42 of the bearing includes four relatively large pockets 80 and 80' the back of the bearing 43 nevertheless has a relatively large flat surface area represented by the webs 85 and the transverse and longitudinal ribs as 86, 87 and 88, and these coplanar surfaces are adapted to be engaged by the flat underside of the adapter 30 as will be described in detail hereinafter.

Figure 3:
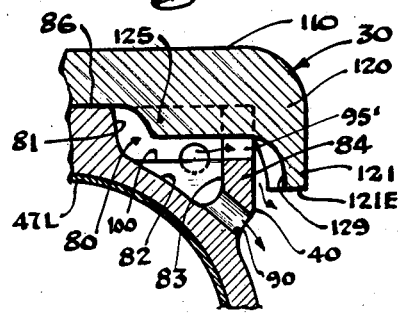
Fig. 3 is a sectional view taken substantially on the line 3—3 of Fig. 2.

As was mentioned above, the pocket 80 is relatively deep in nature, and the bottom of the pocket 80 is tapped by a drain passage 90 of relatively small diameter which, as shown in Fig. 3, extends downwardly from the bottom of the pocket 80, through the solid intervening wall 84 and opens at one side of the outer wall 40 of the bearing at a point below the bottom of the pocket 80.

An elongated vent passage 91, Fig. 8, to be described in more detail hereinafter, enables the interior of bore 20B, Fig. 6, of the bearing to be vented to ambient atmosphere surrounding the bearing, and the two passages 90 and 91 both have ends communicating with the pocket 80 as can be realized from Figs. 7 and 8. It should be pointed out further that an enlarged passage in the form of a wide throat 95, Fig. 8, is formed in the outer wall 40 of the bearing so as to disclose a relatively large passageway between the pocket 80 and the outer wall side extremities of the bearing. Thus, the throat is open at the top and is bounded on its two sides by shoulder surfaces 96 and 97 of the outer wall of the bearing and on its bottom by one side of an L-shaped ledge 100, Fig. 8. The L-shaped ledge 100, Figs. 7 and 8 extends about a portion of the pocket 80, and this ledge as will be apparent from Fig. 3 is disposed in a plane above the bottom wall of the pocket 80.

The passage 91 is drilled through the solid body portion of the bearing 20 along one side thereof and at a point near the upper periphery of the bore 20B of the bearing as will be apparent from Fig. 6. The arrangement and extent of the elongated passage 91 is such that the passage 91 has an outer end 105 opening at the forward peripheral surface 60 of the bearing and an inner end 106, Figs. 8 and 10, which opens at the ledge 100 mentioned above. The passage 91 is so located that an intermediate portion 108, Fig. 10, thereof communicates with an oval shaped opening formed in the inner wall 47' of the bearing just inwardly of the end surface 60 of the bearing 20B adjacent the front end thereof, and it is to be pointed out that the opening 109 is of greater area than the diameter of the passage 91 so that air forced into the latter attains a relatively high velocity after passing the opening 109.

Figure 4:
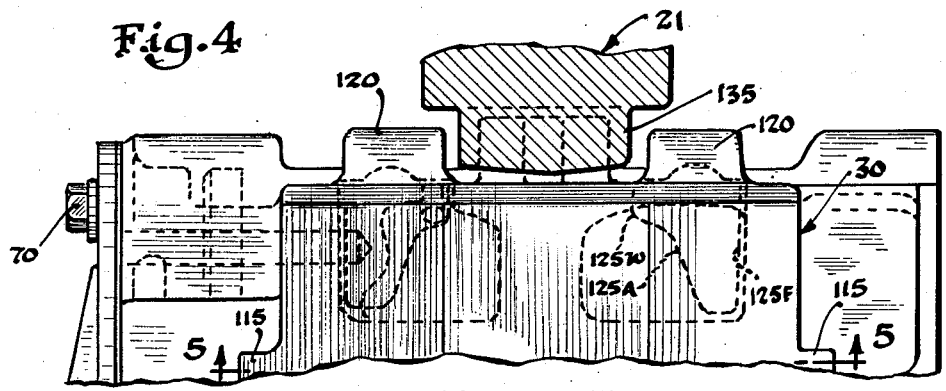
Fig. 4 is a top plan view, partly in section, of a portion of the structure shown in Fig. 1.

The adapter 30, Figs. 4 and 5, holds the bearing in place relative to the truck of the car, and as was mentioned above the bearing 20 in the present instance can be utilized either with a pedestal-type car truck or a truck equipped with a journal box. In the latter instance, the bearing 20 will be mounted within the journal box so that the outer wall 40 of the bearing will be spaced from the inner surfaces of the journal box, and it is merely necessary to remove the lugs 22, Fig. 1, from the outer wall of the bearing 20 to enable the same to be disposed within a conventional journal box. In this connection attention is directed to drawings in my application Ser. No. 524,640 filed July 27, 1955.

The adapter 30 is likewise capable of being utilized either with a pedestal frame 21 as in Fig. 1 of the drawing or a journal box, and in the latter instance the adapter 30 will be disposed as a conventional wedge between the back 42 of the bearing 20 and the inner side of the top wall of the journal box. In this connection attention is also directed to drawings in my aforesaid application.

The adapter 30 has an arcuate back indicated at 110 in Fig. 5 and has a flat lower face 111. When in operative position between the top plate of the pedestal frame 21 and the back 42 of the bearing 20, the arcuate back 110 of the adapter 30 acts as a wedge holding the bearing 20 securely in place. As will be apparent from the description to follow, the adapter 30 is symmetrical in all respects so that it is immaterial which end of the bearing 30 faces outwardly or inwardly as viewed in Fig. 6. Thus, identical hooks 115 are cast integral with the main body portion 116 of the adapter 30 at either end thereof, and these hooks are adapted to be engaged by a conventional tool to remove the adapter 30 from its operative position. The axial length of the main body portion 116 of the adapter 30 corresponds substantially to the spacing between the terminal faces of the ribs 87 and 88 formed on the back 42 of the bearing 20 as can be seen in Fig. 6, and the hooks 115 are disposed substantially on the axial center line of the adapter 30 as can be seen in Fig. 4.

Projecting outwardly from each of the opposed sides of the adapter 30 (see Fig. 4), are a pair of spaced apart lugs 120, and these lugs include depending leg portions 121, Fig. 3, having lower ends 120E extended somewhat below the ledge surfaces 100 of the bearing described above. It will be further observed in Fig. 3 that the depending portions 121 of the adapter lugs 120 are spaced slightly outwardly of the outer faces of the solid portions 84 included as part of the outer wall of the bearing.

The lugs 121 are so spaced relative to one another as to include portions in registry with the pockets 80 and 80' of the bearing as can be seen in Fig. 2, and each lug 120 includes a boss 125, Figs. 3 and 5, which projets downwardly a slight distance below the underside of the main body portion 116 of the adapter 30 and is of such size as to repose in the pockets 80 and 80' as shown in Fig. 6. Each such boss 125 has a flat outer face as 125F, Figs. 2 and 4, and a beveled or angled inner face 125A which flares in to a wider portion 125W, Fig. 4, that corresponds in width to the depending lug leg 121.

As shown in Fig. 3, the bosses 125 are of less vertical dimension than the depth of the passage throat 95 and the lower surface of the cross corresponding to the pocket 80 is spaced above the ledge 100. However, the bosses 125 reduce the area of the passage throat 95 to afford passage throats 95' of reduced area.

The inner faces of the depending portions 121 of the adapter lugs 120 are recessed at 129, Figs. 3 and 5, and these recessed portions are opposite the intermediate areas of the passage throats 95' thereby defining a tortuous passage indicated by arrows in Fig. 3 extending from the inner open end of the vent or air passage 91 out through the restricted passage throat 95' and downwardly between the outer side wall of the bearing and the recess 129 to ambient atmosphere surrounding the bearing 20. Each lug 120 embodies the foregoing construction so that any one of the four lugs 120 is capable of cooperating with a pocket 80 and the related passage structure as described above.

As shown in Fig. 4, the pedestal frame 21 is provided with relatively large bosses 135, that extend inwardly toward the sides of the outer wall of the bearing 20, and the spacing between the adapter lugs 120 is such that the lugs 120 embrace a boss as 135 with some spacing between the opposed front and rear surfaces. Thus, a boss as 135 included on the pedestal frame represents a limit stop for the lugs 120 thereby limiting relative movement between the parts to a predetermined degree. In like manner, the bosses 125 of the adapter having solid surfaces 125F disposed within the pockets 80 and 80' and spaced slightly from opposed solid surfaces 130 of the bearing outer wall (see Fig. 2) limit relative movement between these parts to a predetermined degree, and inasmuch as the depending portions 121 of the adapter lugs are closely spaced opposite solid portions at the sides of the outer wall of the bearing 20 as can be seen in Fig. 3, relative movement in a left or right hand direction or rotative sense as viewed in Fig. 3 between these parts is limited to a predetermined degree.

The relative size or areas of the dust pocket 80 and the several passage means associated therewith play an important role in operation of the vent system under the present invention. Thus, as was mentioned above, the dust pocket 80 and the associated pockets 80' are relatively large in size, that is, the combined areas thereof represent a significant portion of the total area of the back of the bearing. The end 160 of the passage 91 that opens into the pocket 80 is of restricted size in comparison to the dust pocket 80, and in this connection it may be pointed out that the drawings in the present instance are to scale including the areas under consideration. More specifically, the bearing (also the modified construction of Figs. 12 to 15) is for a standard 5/1/2 x 10 car journal, and in this instance the pocket 80 has an axial length approximately two and nine-sixteenths inches and a width, at the widest point, of approximately one and thirteen-sixteenths inches. The throat 95 has a length approximately one and thirteen-sixteenths of an inch. The passage 91 has a diameter approximately seven-sixteenths inch, and the dimension of the opening 109 as viewed in Fig. 6 is approximately one-half inch by seven-eighths of an inch. As mentioned above, the difference in area between the opening 109 and the passage 91 accounts for air pumped from the bore of the bearing attaining a relatively high velocity as it enters the passage 91, and its velocity is of course slowed as it passes into the enlarged dust pocket 80. Inasmuch as the lower periphery of the passage 91 is below the ledge 100 as will be apparent from Figs. 2, 3 and 8, there is a tendency for any oil that may be entrained in the air thus pumped from the bore of the bearing to settle or collect in the passage 91, and the oil thus trapped will tend to be sucked back into the bearing during the suction stroke of the journal acting as a piston.

During the suction stroke of the journal, there is of course a tendency to draw air into the bore of the bearing from the exterior of the bearing. However, any dust, snow or like foreign matter that may be entrained in the air thus drawn into the bore of the bearing is caused to settle in the dust pocket 80. Thus, air drawn into the bore of the bearing will pass upwardly through the passage, Fig. 3, that is established between the outer wall of the bearing and the recess 129 in the adapter lug 121 spaced therefrom, through the throat 95 restricted at 95' by the adapter boss 125, and into the dust pocket 80. Air also tends to be drawn into the pocket 80 through the drain passage 90, which, it should be noted, is approximately the same diameter as the vent passage 91.

Inasmuch as air thus drawn into the pocket 80 expands into the pocket 80 after passing through the restricted throat passage 95' and the drain passage 90, the velocity thereof will be slowed, and then its velocity will be substantially increased as it enters the vent passage 91. Such changes in velocity account for a cyclone effect within the dust pocket 80 causing particles that may be entrained in the air to settle in the dust pocket 80 so that any air that is drawn into the bore of the bearing is relatively clean. The dust pocket 80 is relatively deep in nature, that is, the bottom of the dust pocket 80 is disposed well below the ledge 100 so that the dust pocket 80 has a relatively large capacity for accumulation of dust or dirt. Moreover, the drain passage 90, Fig. 3, is located at the lowest point of the dust pocket 80 so that dirt, dust and the like that does accumulate therein is drained to the exterior of the bearing, and this is facilitated by sloping the bottom wall or side 82, Fig. 3, of the dust pocket 80 downwardly from the inner vertical wall 81 toward the drain passage 90. The drain passage 90 is of course primarily in the nature of a continuously open sump tap which continuously drains any liquids such as rain water and melted snow and ice from the dust pocket 80, and any accumulations of debris will of course be carried out therewith. In the event that there is a tendency for water to freeze in the dust pocket 80, as for instance when the car is idle at freezing temperatures, such accumulations of ice will melt when the car later has been sufficiently long in motion to cause the bearing to heat in normal use.

A modified form of the invention is illustrated in Figs. 12–15 inclusive in the form of a bearing 20A wherein the vent passage is so constructed and formed as to communicate with the bore of the bearing substantially at the longitudinal or axial center point thereof. Thus, referring to Fig. 12, it will be noted that many of the reference characters used above to identify parts in Figs. 1 to 11 have been used in Fig. 12 to identify similar parts, and hence such parts need not be redescribed in detail. In other words, the description to follow will be concerned for the most part with the changes that would be required to convert a bearing as 20 described above to the bearing 20A. First of all in this connection it should be pointed out that the inner end seal of bearing 20A is in the form of an expendable seal ES in contrast to the solid ring-type seal 59, Fig. 6, and accordingly the groove SG, Fig. 12, in which the seal ES is mounted is larger than the groove 58, Fig. 6, and is L-shaped in section to provide an inner rib RB against which the inner portion of the seal ES abuts upon being pressed into the groove SG from the wide outer end. It will be realized that such modified seal construction can be adopted in the bearing 20.

The bearing 20A includes dust pockets 80 of the kind described in the connection with bearing 20, each of which is tapped by a drain passage 90. The adapter 30 again has lugs 25 constructed to enable passage of air freely into and out of the related pocket 80, and an internal confined vent passage 91 similar to that described above is embodied in the solid outer wall of the bearing 20A.

Instead of communicating with the bore of the bearing in the manner illustrated in Fig. 10, passage 91 communicates with a passage 200 formed in an end closure cap 205, Figs. 12 to 15 removeably mounted at the front of the bearing 20A. Thus, the passage 200 is an internal passage in the cap 205 which extends at a diagonal. The upper end 206 of the passage 200 is in direct communication with the outer end of the passage 91, and the lower end 208 of the passage 200 extends to an inwardly directed boss 210 which is located medially at the inside of the cap 205 so as to be co-axial with the axis of the bore of the bearing 20A.

Figure 12:
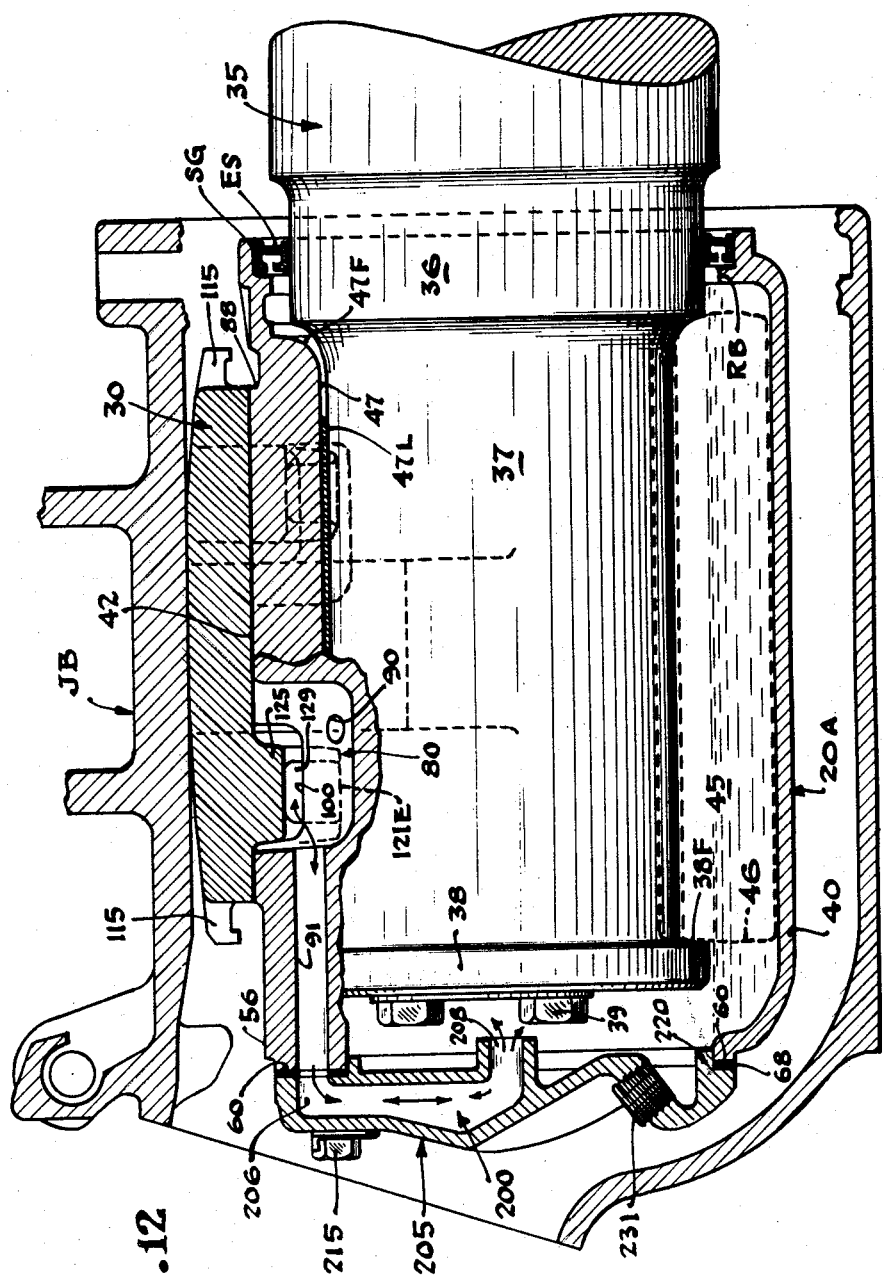
Fig. 12 is a sectional view, partly broken away, showing a modified form of bearing construction.

The cap 205 is held to the front or outer end of the bearing 20A by cap screws 215, Figs. 12 and 13, having threaded ends which are extended into tapped openings located in the circumference of the main wall of the bearing 20A. The cap 205 is formed with an inner annular flange 220, Figs. 12 to 14, which is adapted to be telescoped into the front open end of the bearing 20A, and as will be observed in Fig. 12, gasket-type seals are positioned between the mating end surfaces of the bearing and the cap to establish a tight seal between these parts.

The lower portion of the cap 205 is formed with a threaded opening 230, Fig. 14, and a closure plug 231, Figs. 12 to 13, is adapted to be tightly secured therein. Upon removal of the plug 231, oil can be poured into the interior of the bearing 20A so as to gravitate into the chamber 45, and a suitable form of lubricator can be mounted in the chamber 45 to pass oil to the journal 37.

The modified construction of Fig. 12 wherein the passage 91 is in effect so extended as to communicate with the bore of the bearing substantially at the axis thereof enables a railroad car provided with the bearing 20A to be completely inverted or held in any tipped position without the oil in the chamber 45 entering the vent passage 91, and this is important in the instance of freight cars which are often subjected to inversion incidental to unloading thereof.

It will also be observed in Fig. 12 that the bearing 20A is shown as mounted within a standard journal box JB. This is conveniently accomplished by removing the spaced walls at the inner end of the journal box which normally provide the slot in which a conventional dust guard is mounted, thereby enabling the bearing 20A to be easily telescoped into the interior of the journal box JB. The adapter 30, under such circumstances, takes the place of the conventional wedge normally used to maintain a standard segment bearing within a journal box.

It will be seen from the foregoing that under the present invention there is provided a one-piece, sleeve-type bearing for the journal of a railway car. Thus, the bearing is of cast, one-piece construction having a high salvage value as mentioned above, and the opposed open ends of the bearing are adapted to be sealed by the seal member 59 or ES and the front end cover 65 or 205 thereby closing off the bore of the bearing and isolating oil within the chamber 45 as well as the lubricator at 46. The one-piece cast construction assures good heat transfer between the walls of the bearing and the oil reservoir. This is particularly important in cold weather operation when it is important to maintain the supply of lubricating oil highly fluid.

In those instances where motion of the journal establishes pressure within the bore of the bearing, air within the bore of the bearing is forced therefrom so as to attain a relatively high velocity through the vent passage 91, and the arrangement is such that any entrained oil is trapped in the passage 91 below the ledge 100. On the opposite stroke of the journal, the lubricant thus trapped is drawn back into the bore of the bearing so that there is substantially no loss of lubricant. Any tendency for foreign matter to be drawn into the bearing at this time is cancelled by the cyclone effect in the dust pocket 80 which causes such foreign matter to settle in the dust pocket 80 so that the air drawn into the bore of the bearing through the passage 91 is clean. By having the passage 91 in effect extended to the axis of the bearing bore, Fig. 12, assurance is had that oil will not drain into passage 91 when the railroad car is tipped.

Hence while I have illustrated and described preferred embodiments of my invention it is to be understood that these are capable of variation and modification, and I therefore do not wish to be limited to the precise details set forth, but desire to avail myself of such changes and alterations as fall within the purview of the following claims.

I claim:

1. In a bearing for a journal, a body member in the form of a one-piece sleeve affording an internal bore in which said journal can be disposed to rotate therein, said body member having a rounded inner wall providing the main bearing surface for said journal, said inner wall being discontinuous at one area to expose a portion of said journal free of said bearing surface, said body member having an exterior outer wall and being provided with an enlarged reservoir chamber for lubricant within said bore to be relayed to the portion of the journal exposed by the discontinuous area of said bearing surface, said body member having an enlarged dust pocket opening in the exterior wall to communicate to the ambient atmosphere and spaced from said bore and said body member having formed in a solid portion thereof between said walls a restricted air vent passage means extended from said pocket to said bore to establish communication between said pocket and said bore, and said body member including additional passage means extended from said pocket to said outer wall to establish communication between said pocket and the ambient atmosphere about said bearing.

2. In a bearing for a journal, a body member in the form of a one-piece sleeve affording an internal bore in which said journal can be disposed to rotate therein, said body member having a rounded inner wall providing the main bearing surface for said journal, said inner wall being discontinuous at one area to expose a portion of said journal free of said bearing surface, said body member having an exterior outer wall and being provided with an enlarged chamber for lubricant within said bore to be relayed to the portion of the journal exposed by the discontinuous area of said bearing surface, said body member having a flat upper back representing an upper surface of said outer wall disposed between opposed sides of said outer wall, an enlarged dust pocket formed in recessed relation in said back, vent passage means of relatively small diameter formed in a solid portion of said body member between said walls and having an end portion communicating with said pocket, said vent passage communicating with an opening extended to said bore and said opening being of greater size in comparison to said vent passage, drain passage means of relatively small diameter formed in said body member and having open ends communicating respectively with the bottom of said pocket and with a side of said outer wall of the bearing at a point below the bottom of said pocket, and said pocket communicating further with a wide throat passage extended to a side of said outer wall in a plane above said drain passage means.

3. In a bearing for a journal, a body member in the form of a one-piece sleeve affording an internal bore in which said journal can be disposed to rotate therein, said body member having a rounded inner wall coextensive with a portion of said bore and providing the main bearing surface for said journal, said inner wall being discontinuous at one area to expose a portion of said journal free of said bearing surface, said body member having an exterior outer wall and being provided with an enlarged chamber for lubricant within said bore to be relayed to the portion of the journal exposed by the discontinuous area of said bearing surface, said body member having an enlarged dust pocket spaced from said bore and being formed with restricted air vent passage means extended from said pocket to said bore, said body member including other passage means extended from said pocket to said outer wall, said body member being formed at the front and rear terminal ends thereof with annular collars each having a greater internal diameter than the internal diameter of said cylindrical inner wall, and said rear collar about the inner face thereof being provided with an annular groove for a seal ring.

4. In a bearing for a journal, a body member in the form of a one-piece sleeve affording an internal bore in which said journal can be disposed to rotate therein, said body member having a rounded inner wall providing the main bearing surface for said journal, said inner wall being discontinuous at one area to expose a portion of said journal free of said bearing surface, said body member having an exterior outer wall and being provided with an enlarged chamber for lubricant within said bore to be relayed to the portion of the journal exposed by the discontinuous area of said bearing surface, said body member having a flat upper back representing an upper surface of said outer wall disposed between opposed sides of said outer wall, an enlarged dust pocket formed in recessed relation in said back, vent passage means of relatively small diameter formed in a solid portion of said body member and having end portions in communication respectively with said bore and said pocket, drain passage means of relatively small diameter formed in said body member and having open ends communicating respectively with the bottom of said pocket and with a side of said outer wall of the bearing at a point below the bottom of said pocket, and said pocket communicating further with a wide throat passage extended to a side of said outer wall in a plane above said drain passage means.

5. In a bearing for a journal, a body member adapted to afford an internal bore in which said journal can be disposed to rotate therein, said body member having a rounded inner wall providing at least a portion of the main bearing surface for said journal, said body member having a continuous 360° exterior outer wall, said body member having an enlarged dust pocket opening in the exterior wall to communicate to the ambient atmosphere and being formed with a restricted vent passage means extended from said pocket to said bore to establish communication between said pocket and said bore, said dust pocket being of greater cross-sectional area in comparison to said vent passage means, and said body member including additional passage means extended from said pocket to said exterior outer wall to establish communication between said pocket and the ambient atmosphere about said bearing.

6. In a bearing for a journal, a body member in the form of a one-piece sleeve affording an internal bore in which said journal can be disposed to rotate therein, said body member having a rounded inner wall providing the main bearing surface for said journal, said body member having a continuous 360° exterior outer wall and having an enlarged dust pocket formed in said outer wall, said body member being formed with restricted passage means extended from said pocket to said bore, said dust pocket being of greater cross-sectional area in comparison to said passage means, and said body member including additional passage means extended from said pocket to said outer wall, said additional passage means being of restricted size in comparison to the dust pocket but of greater cross-sectional area in comparison to the first-named passage means.

7. In a bearing for a journal, a body member in the form of a one-piece sleeve affording an internal bore in which said journal can be disposed to rotate therein, said body member having a rounded inner wall providing the main bearing surface for said journal, said body member having an exterior outer wall and a flat upper back representing an upper surface of said outer wall disposed between opposed sides of said outer wall, at least one enlarged concave pocket formed in recessed relation in said back, vent passage means of relatively small diameter formed in a solid portion of said body member and having end portions communicating respectively with said bore and said pocket, drain passage means of relatively small diameter formed in said body member and having open ends communicating respectively with the bottom of said pocket and with a side of said outer wall of the bearing at a point below the bottom of said pocket, and said pocket communicating further with a wide throat passage extended to a side of said outer wall in a plane above said drain passage means.

8. In a bearing for a journal, a body member having inner and outer walls and the inner wall thereof defining a portion of the bore of the bearing, a dust pocket formed in said body member to be disposed between said inner and outer walls, vent passage means of restricted size extended from the bore of the bearing to said pocket, and other vent passage means extended from said pocket to a point along the outer wall of said body member, said pocket being of greater cross sectional area than the vent passage means of restricted size and also of greater cross sectional area than said other vent passage means, and said body member having a drain passage extended from the bottom of said dust pocket to a point on said outer wall below the bottom of said dust pocket.

9. In a bearing for a journal, a body member adapted to afford an internal bore in which said journal can be disposed to rotate therein, said body member having a rounded inner wall providing the main bearing surface for said journal, said body member having an exterior outer wall, said body member having an enlarged dust pocket and being formed with a restricted vent passage means extended from said pocket to said bore to establish communication between said pocket and said bore, at least one other pocket in said body member, said body member including another vent passage means extended from said dust pocket to said exterior outer wall to establish communication between said dust pocket and the ambient atmosphere about said bearing, and an adapter for said body member having spaced lugs depending from sides thereof and adapted to be disposed outwardly of opposed sides of the outer wall of said body member, said adapter having portions thereof reposable in said pockets of the body member, and said adapter having a portion for restricting in part the size of said other vent passage means in said body member.

10. In a bearing for a journal, a body member adapted to afford an internal bore in which said journal can be disposed to rotate therein, said body member having a rounded inner wall providing the main bearing surface for said journal, said body member having an exterior outer wall, said body member having an enlarged dust pocket and being formed with a restricted vent passage means extended from said pocket to said bore to establish communication between said pocket and said bore, at least one other pocket in said body member, said body member including another vent passage means extended from said dust pocket to said exterior outer wall to establish communication between said dust pocket and the ambient atmosphere about said bearing, and an adapter for said body member having spaced lugs depending from sides thereof and adapted to be disposed outwardly of opposed sides of the outer wall of said body member, said adapter having portions thereof reposable in said pockets of the body member.

11. In a bearing for a journal, a body member in the form of a one-piece sleeve affording an internal bore in which said journal can be disposed to rotate therein, said body member having a rounded inner wall providing the main bearing surface for said journal, said body member having an exterior outer wall and a flat back and being provided with a plurality of enlarged pockets of substantially identical size and configuration and symmetrically arranged in said back, said body member being formed with vent passage means extended from one of said pockets to said bore, said vent passage being of restricted size relative to said dust pocket, said body member including a plurality of other passage means of substantially identical size and configuration and each extended from the outer side of each of said pockets outwardly to said outer wall, said other passage means each being of restricted size relative to said pockets, and an adapter for said body member having spaced lugs of substantially identical size and configuration depending symmetrically from sides thereof at positions corresponding to each of said pockets, and said adapter having bosses symmetrically located thereon and each being of substantially identical size and configuration and each partly reposable in a related of said pockets and in a portion only of each said other passage means.

12. An adapter for a railway journal bearing of the kind described and comprising, a body portion having lateral and longitudinal dimensions and a flat lower face and an arcuate back, a pair of spaced lugs of predetermined narrow width having portions depending downwardly from each of the opposed sides of said body member, said lugs each having an outer wall and an inner wall and terminating at lower ends spaced below the flat lower face of said body member, and said adapter including bosses at the underside thereof equal in number and in location to said lugs, said bosses each being of substantially the same configuration and size and of less lateral dimension than said body member and depending from the lower face of said body member at points directly opposite and inwardly of said lugs, said bosses having wide outer ends substantially of the same width as said lugs and having narrower inner ends.

13. An adapter according to claim 12 wherein the inner walls of said lugs are recessed.

14. An adapter for a railway journal bearing of the kind described and comprising, a body portion having lateral and longitudinal dimensions and a flat lower face and an arcuate back, said body member having hook members at the opposite ends thereof, a pair of spaced lugs of predetermined narrow width depending downwardly from each of the opposed sides of said body member, said lugs each having an outer wall and an inner wall and terminating at lower ends spaced below the flat lower face of said body member, and a boss associated with each of said lugs, said bosses projecting from the flat lower face of said body portion.

15. In a bearing for a journal, a body member having inner and outer walls and the inner wall thereof defining a portion of the bore of the bearing, an enlarged dust pocket formed in the outer wall of said body member and spaced from said inner wall, vent passage means of restricted size in comparison to said dust pocket and extended from the bore of the bearing through the body member to said pocket, and additional vent passage means extended from said pocket and opening at a point along the outer wall of said body member to communicate the dust pocket to the ambient atmosphere, said additional vent passage means being of restricted size in comparison to said dust pocket but of larger size in comparison to the first-named passage means.

16. In a bearing for a journal, a body member having inner and outer walls and the inner wall thereof defining a portion of the bore of the bearing, an enlarged dust pocket formed in the outer wall of said body member and spaced from said inner wall, vent passage means of restricted size in comparison to said dust pocket and extended from approximately the axial center of the bore of the bearing and through the body member to said pocket, and other vent passage means extended from said pocket and opening at a point along the outer wall of said body member, said other vent passage means being of restricted size in comparison to said dust pocket but of larger size in comparison to the first-named passage means.

17. A bearing according to claim 16 having a removable end closure cap secured to one end of the bearing, said closure cap having an internal passage opening at one end approximately at the axial center of the bore of the bearing and being in communication at the other end with the first-named vent passage means.

References Cited in the file of this patent

UNITED STATES PATENTS

| | | |
|---|---|---|
| 262,025 | England | Aug. 1, 1882 |
| 2,175,659 | Blackmore | Oct. 10, 1939 |
| 2,736,618 | Watson | Feb. 28, 1956 |

FOREIGN PATENTS

| | | |
|---|---|---|
| 737,892 | France | Oct. 10, 1932 |
| 528,919 | Canada | Aug. 7, 1956 |